(12) United States Patent
Gelhar

(10) Patent No.: US 11,320,275 B2
(45) Date of Patent: May 3, 2022

(54) METHOD FOR PRODUCING ALTERNATIVE ROUTE SUGGESTIONS

(71) Applicant: NEUSOFT TECHNOLOGY SOLUTIONS GmbH, Hamburg (DE)

(72) Inventor: Jens Gelhar, Hamburg (DE)

(73) Assignee: Neusoft Technology Solutions GmbH, Hamburg (DE)

( * ) Notice: Subject to any disclaimer, the term of this patent is extended or adjusted under 35 U.S.C. 154(b) by 11 days.

(21) Appl. No.: 16/639,337

(22) PCT Filed: Jul. 18, 2018

(86) PCT No.: PCT/EP2018/069480
§ 371 (c)(1),
(2) Date: Feb. 14, 2020

(87) PCT Pub. No.: WO2019/037959
PCT Pub. Date: Feb. 28, 2019

(65) Prior Publication Data
US 2020/0249033 A1   Aug. 6, 2020

(30) Foreign Application Priority Data

Aug. 23, 2017 (DE) .......................... 102017214746.6

(51) Int. Cl.
*G01C 21/34* (2006.01)
(52) U.S. Cl.
CPC ....... *G01C 21/343* (2013.01); *G01C 21/3453* (2013.01)

(58) Field of Classification Search
None
See application file for complete search history.

(56) References Cited

U.S. PATENT DOCUMENTS

| 6,321,161 | B1 * | 11/2001 | Herbst | G01C 21/3415 |
| | | | | 340/905 |
| 8,583,363 | B2 * | 11/2013 | Abraham | G01C 21/3453 |
| | | | | 701/416 |
| 9,791,284 | B2 * | 10/2017 | Poppen | G01C 21/3605 |
| 10,139,243 | B2 * | 11/2018 | Rovik | G01C 21/3667 |

(Continued)

FOREIGN PATENT DOCUMENTS

| DE | 102011007146 | 10/2012 |
| EP | 2131150 | 12/2009 |

(Continued)

OTHER PUBLICATIONS

PCT International Preliminary Report in International Appln. No. PCT/EP2018/069480, dated Mar. 5, 2020, 15 pages (with English Translation).

(Continued)

*Primary Examiner* — Ryan Rink
(74) *Attorney, Agent, or Firm* — Fish & Richardson P.C.

(57) ABSTRACT

Information about selection parameters is obtained from a starting position to a destination position along an initial route. At least one alternative route is calculated by selecting a waypoint as an intermediate destination based on an initial route calculation and the selection parameters. The at least one alternative route is determined through the waypoint differs from the initial route on a specific section on which the intermediate destination lies.

12 Claims, 4 Drawing Sheets

(56) References Cited

U.S. PATENT DOCUMENTS

| | | | | |
|---|---|---|---|---|
| 2004/0088109 A1* | 5/2004 | Miyashita | G01C 21/34 | 701/437 |
| 2006/0116815 A1* | 6/2006 | Nomura | G01C 21/3415 | 701/417 |
| 2006/0136123 A1* | 6/2006 | Chinitz | G01C 21/3476 | 701/410 |
| 2009/0234577 A1* | 9/2009 | Rinscheid | G01C 21/3415 | 701/533 |
| 2010/0057346 A1* | 3/2010 | Ehrlacher | G01C 21/3461 | 701/533 |
| 2010/0114471 A1* | 5/2010 | Sugiyama | G01C 21/3664 | 701/532 |
| 2010/0312466 A1* | 12/2010 | Katzer | G08G 1/096838 | 701/533 |
| 2013/0110392 A1* | 5/2013 | Kosseifi | G01C 21/3415 | 701/410 |
| 2013/0325320 A1* | 12/2013 | Dimitriadis | G01C 21/3415 | 701/414 |
| 2015/0241225 A1* | 8/2015 | Liu | G01C 21/3667 | 701/540 |
| 2015/0292894 A1* | 10/2015 | Goddard | G01C 21/3453 | 701/400 |
| 2016/0187152 A1* | 6/2016 | Tanizaki | G01C 21/3676 | 701/414 |
| 2017/0023374 A1* | 1/2017 | Poppen | G01C 21/3476 | |
| 2017/0059339 A1* | 3/2017 | Sugawara | G01C 21/3461 | |
| 2017/0254655 A1* | 9/2017 | Kato | G06Q 10/047 | |
| 2017/0314949 A1* | 11/2017 | Rovik | G01C 21/3461 | |
| 2017/0356752 A1* | 12/2017 | Lobo | G01C 21/3679 | |

FOREIGN PATENT DOCUMENTS

| | | |
|---|---|---|
| EP | 2224211 | 9/2010 |
| EP | 3040683 | 7/2016 |
| EP | 2175240 | 3/2018 |
| WO | WO 2016062732 | 4/2016 |

OTHER PUBLICATIONS

EP Office Action in European Appln. No. 18743007.9, dated Mar. 31, 2020, 7 pages.

DE Search Report in German Appln. 102017214746.6, dated Mar. 15, 2018, 17 pages (with English Translation).

PCT International Search Report and Written Opinion in International Appln. No. PCT/EP2018/069480, dated Nov. 6, 2018, 16 pages (with English Translation).

* cited by examiner

METHOD FOR PRODUCING ALTERNATIVE ROUTE SUGGESTIONS

TECHNICAL FIELD

The present invention relates to generating alternative route suggestions and to a corresponding system such as a navigation system.

BACKGROUND

Conventional route calculations are made based on different models. For example, the fastest, shortest, most convenient or the most economical "Eco" route is calculated. The disadvantage of conventional route calculations is however the fact that identical routes are often created and long calculation times arise due to the many independent calculations.

Other route calculations are made based on an optimum route. The optimum route is calculated by adding artificial additional costs to the calculated route and again calculating a route in order to obtain a first alternative route. This process is repeated in order to obtain further alternative routes. However, the disadvantage of this type of route calculation is that it is difficult to calibrate the additional costs, unreasonable routes are calculated, and the results are defined by "what is not wanted" instead of "what is wanted".

Known methods are based on manipulating the cost model used for the route search. Either a completely different model is used, for example a short route instead of a fast one, or the roads of the route that is found first are penalized in terms of cost compared to other roads in order to favour a detour.

This often creates routes that are unnecessarily poor according to the criteria actually intended by the user, i.e. the selected cost model.

Examples of unwanted routes that result from the common method of "making the original route more expensive" are for example nonsensical and extensive detours. If there is essentially no sensible travel alternative to a canonical route (for example to using the A24 between Hamburg and Berlin), the generally increased costs nevertheless force an extensive detour that no driver would choose (for example 1 hour and up to 100 km more).

In this case, sensible alternative suggestions would simply choose a different route from the start to the freeway and, accordingly, at the intended location for leaving the freeway to the destination, in each case possibly including the choice of a different intersection.

One extreme example of an extensive detour is that of a diversion, that is to say, in order to avoid a short section of the original route, a detour is performed as far as a turning point in order to return to the original route in practically the same way. This may easily happen in the case of routes via controlled access roads, for example freeways, which generally offer few possible variations and where turning onto the diversion is possible only at intersections.

In order to avoid extensive detours, it is advisable to choose the additional route costs for the original route to be relatively low. However, this increases the risk of the "alternatives" that are thus calculated not differing at all from the original route, since the additional costs may no longer be sufficient to force a detour.

This problem also often occurs in the case of the other established method of using different cost models, since for example the fastest route is often at the same time the shortest, most economical or most convenient one.

Individual roads, in particular freeways and roads similar to freeways, are often represented in sections in navigation databases by a plurality of parallel connections. Typical examples are parallel lanes in the area of freeway intersections, for example "express lanes" on North American highways, or parallel tunnel bores (Elbe Tunnel in Hamburg). Such parallel lanes often extend over several kilometers, alongside the main road usually preferred by the original route, and differ only slightly therefrom in length and speed. Alternative route algorithms are therefore susceptible to offering false alternatives which, from the driver's point of view, differ only in the choice of a different lane.

SUMMARY

One object of the present invention is therefore to provide a method for generating alternative route suggestions that overcomes the existing disadvantages in the prior art and improves user experience.

A further object of the present invention is to avoid diversions, since the ratio of the route costs of the detour in particular becomes exorbitantly high in comparison with the section that is bypassed. Such alternative route options are rejected and, if available, more sensible alternatives are offered.

A further object of the present invention is also to find an alternative route that differs from the original route. Since the artificial waypoint "signature link" is always selected away from the original route, the alternative route will differ from the original route at least in the area of the waypoint.

A further object of the present invention is to recognize false alternatives and to reject them.

Said objects are achieved according to the features of independent patent claim 1 in that information about selection parameters is obtained from a starting position to a destination position along an initial route, wherein at least one alternative route is calculated by selecting a waypoint as an intermediate destination based on an initial route calculation and the selection parameters, wherein the at least one alternative route determined through the waypoint differs from the initial route on a specific section on which the intermediate destination lies.

In addition to the known and researched calculation of the initial "best" route, one or more further routes to the same destination are intended to be displayed to the user and offered for navigation. These routes should differ significantly from the initial route, thus should be advantageous based on the same criteria as those of the initially calculated route and generally should be close to what the human user perceives as a sensible driving alternative.

Therefore, the cost model is not changed in the present invention and remains the same. The alternative routes are determined and evaluated on the basis of the original cost function.

Since the alternative routes are calculated based on the same cost function as the originally calculated route, it is possible here to dispense with recalculating the costs of the waypoint candidates, and therefore in particular to save on access operations to the navigation database and other cost sources such as traffic data.

Alternative routes are evaluated in comparison with the originally found route. The desired properties of the alternative route are thereby able to be approximated and unwanted artefacts (detours that are not comprehensible to the user) of the earlier methods are able to be excluded.

The present invention considers a large selection of possible route variations at the same time and compares them with the best route in each case. It is thereby able to be seen that the extensive detours have only considerable disadvantages and that small-scale variants, for example in the vicinity of the start and destination, are also found and correspondingly evaluated as being better.

One advantage of the present invention is that the initial route calculation is used to define criteria for desired types of alternative routes and to determine the "easy" waypoint that produces the best result.

A further advantage of the present invention is that false alternatives, extensive detours, diversions and artefacts are avoided and rejected.

Based on the same cost function as the originally calculated route, a further advantage is that an alternative route is able to be calculated considerably faster than in the earlier methods with a suitable implementation.

Preferred or advantageous embodiments of the invention will become apparent from the dependent claims, from the following description, and from the attached figures.

Expanded connection options are preferably potential waypoint candidates. In order to determine the alternative routes arising from the waypoint candidates, the expanded connection options of the initial route calculation are taken into consideration.

A bidirectional route calculation and/or an alternate route calculation is preferably carried out.

The selection of alternative route suggestions is preferably taken into consideration at the same time and compared with the initial route.

For the evaluation of alternative route suggestions, cost parameters of the determined deviating section and those of a bypassed section of the initial route are preferably taken into consideration.

Distance parameters of the bypassed section on the initial route are preferably evaluated. A position of the waypoint within the section deviating from the initial route may likewise be taken into consideration. Further properties, such as for example average speed, tunnel lengths, toll costs, travel time, or abstract route costs etc. may likewise be evaluated. Small deviations for example in the area of the start and destination position are thus evaluated differently than deviations near the middle of the route of the initial route.

The deviating section has a minimum length of preferably 25 km for a freeway-like route or a minimum length of preferably 200 m for short routes. It is of course possible to define different minimum lengths.

The waypoint preferably lies centrally on the deviating section.

A backward expansion is preferably performed on the basis of the determined cost and distance parameters of the expanded route suggestions of the initial route calculation.

The system that executes the method is preferably a navigation system.

BRIEF DESCRIPTION OF THE DRAWINGS

Further features, advantages and effects of the invention will become apparent from the following description of exemplary embodiments and the attached figures, in which.

DETAILED DESCRIPTION

Figure 1:
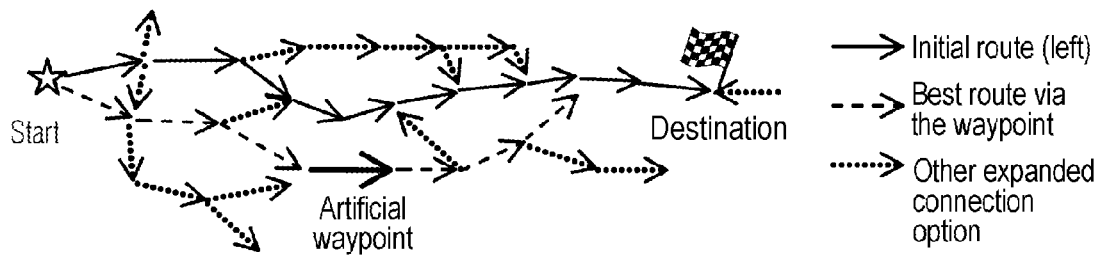
FIG. 1 shows an exemplary embodiment of a waypoint candidate (also called signature link candidate here)

FIG. 1 shows common algorithms for finding the best route, based on gradually expanding connection options. Depending on the chosen implementation, this may be performed beginning at the starting location until reaching the destination, vice versa from the destination to the start, or from both sides until a connection is created.

In any case, in addition to the connection options on the route that is ultimately found, further connection options are always expanded and alternative routes are thus implicitly considered.

In the case of a simple route search, the additional connections that are thus found, which are not optimum in terms of cost, are rejected.

Alternative routes are calculated by selecting a suitable link "signature link" as a waypoint that has an intermediate destination between the start and the destination. The alternative route corresponds to the best route from the start via this waypoint (intermediate destination) to the destination.

One preferred embodiment is to adopt all of the connection options that are expanded in the initial route calculation, with the exception of those lying on the initial route, as a set of potential signature links. In order to expand the set of potential signature links or the waypoint candidates, it may be expedient to perform more expansions in the initial route calculation than would actually be necessary to determine the best route. It is also possible to expand the set of waypoint candidates in other ways, for example through waypoints selected based on geometric criteria.

The implementation further restricts the output set that is effectively used by also considering only the connection options that are expanded in the initial route calculation in order to determine the alternative routes arising in each case from the waypoint candidates. With this restriction, an alternative route is only able to arise at all from a waypoint candidate if there is a route from the start to the destination via this waypoint in the originally expanded search space. Connection options that lead to a dead end in the reduced search space are rejected in the further course of the algorithm.

The initial route calculation is performed using a standard algorithm, for example A*, or Dijkstra. It is in this case unimportant whether expansion takes place in one direction from start to destination or vice versa or bidirectionally.

Figure 2:
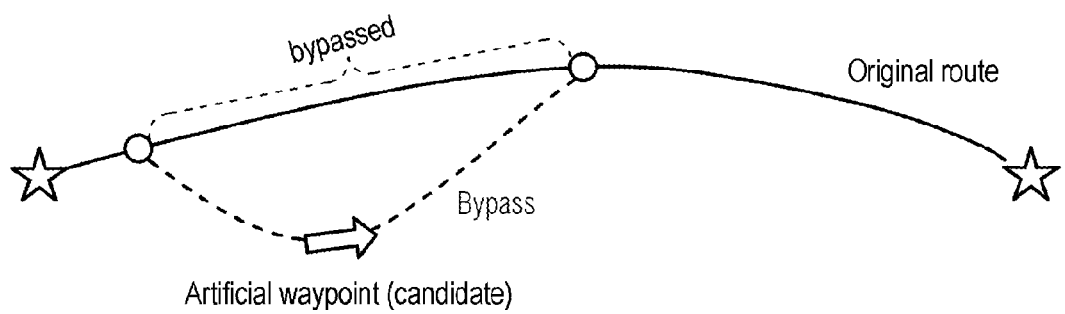
FIG. 2 shows an exemplary embodiment of the evaluation of possible alternative routes.

FIG. 2 shows the evaluation of possible alternative routes. If an intermediate destination is inserted between the start and the destination and the best route is then calculated from the start to the destination via the intermediate destination, a route is thus created that differs from the original route on a specific section on which the intermediate destination lies. This "bypass" section is always present, since only waypoints that do not lie on the original route are considered as waypoint candidates. In extreme cases, the deviating section may extend over the entire length of the route.

It is additionally also possible to define an alternative route using in each case two or more waypoints.

If it is assumed or ensured that a waypoint does not lie on the initially calculated route, the route that is thus defined will obviously differ from the initial route. It will in this case branch off from the initial route at one point, which may also be the starting position, and will reunite with it at another point, which may be identical to the destination position. In the case of expanded destinations consisting of several signature links, for example entire roads or locations, an alternative route may also reach the destination at a location different from the initial route without directly meeting this route there. In the present algorithm, such cases are treated computationally as a union with the initial route at the destination point. Alternatively, it is also possible to exclude from consideration waypoint candidates that would lead to the destination being reached elsewhere.

If it is assumed or ensured that the initial and the alternative routes are optimum in terms of the road network under consideration, there will only be one deviating section per waypoint.

The set of waypoint candidates taken into consideration for the waypoint is given by the results of the initial route calculation. All of the connection options that are expanded in the initial route search but do not belong to the initial route are taken into consideration.

If the set is not sufficient to generate the desired routes, it may be expanded, for example by performing additional expansions that are not actually necessary to determine the best route. It is also possible to select waypoint candidates independently of the initial route calculation, for example based on the positions of the start and the destination, and the course of the initial route.

For each of these waypoint candidates, the properties of the route resulting hypothetically therefrom are evaluated. It is expedient to choose the algorithm and the evaluation criteria in such a way that the individual routes therefore do not yet have to be completely generated at this time.

The method incorporates three main criteria into the evaluation:

Length and relative position of the area in which the potential alternative route differs from the initial route. Instead of the length, related factors such as travel time, abstract route costs, etc. may also be used;

Travel costs of the area deviating from the initial route in relation to the costs of the corresponding section on the initial route. Other factors such as distance, travel time, financial costs etc. may also be considered here.

Position of the waypoint, within the area deviating from the initial route due to avoidance of distorted routes.

An evaluation is given for each waypoint candidate on the basis of these or similar criteria. The waypoint candidate with the best rating is chosen as the waypoint and thus defines an alternative route suggestion.

Figure 3:
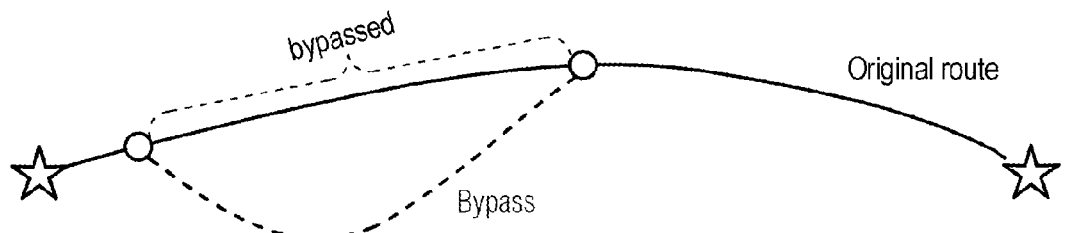
FIG. 3 shows an exemplary embodiment of a calculated alternative route based on costs.

FIG. 3 shows the first sub-criterion for the evaluation of possible alternative routes that have the resulting abstract route costs. Assuming that the initial route, as intended, is the best one in terms of cost, an alternative route will always have higher overall costs.

The costs of the bypass on the possible alternative route and those of the bypassed section of the initial route "bypassed" are taken into consideration. The ratio of the costs of these route sections is incorporated as a factor into the evaluation of the signature link candidate (waypoint candidate). If the relative increase is beyond a certain threshold, for example 25%, the potential increase may generally be excluded as a sensible alternative.

In addition to the original cost factor used in the route calculation, other cost contributions may also be incorporated into the evaluation. The implementation gives slightly improved ratings for shorter detours in terms of distance, for example even in the case of the "fast route" cost factor.

The length of the deviating section should have a "reasonable" relationship with the overall route. An alternative route should not just differ from the original route in a trivial, short section, in particular not in the middle part of the route. If there is no need to bypass a long route section, shorter deviations are however, also accepted in the vicinity of the start and the destination, for example the choice of a different freeway intersection.

In order not to erroneously give preference to long-winded routes, only the bypassed section on the original route is always evaluated when evaluating the length of the deviation, and not the bypass itself. In the implementation, the evaluation is performed on the basis of the respective distances. The evaluation could however also be performed on the basis of the route costs or other cost factors.

The length of the bypassed section may be evaluated in relation to the overall length of the initial route, on one hand, and in relation to the distance between the end or beginning of the bypass and the start or destination, on the other hand. A mixture of both relationships is preferably used.

Alternative routes that generate a bypassed section below a selected minimum length should be rejected. It has proven to be expedient to set this minimum length to be high, preferably 25 km, if the entire section that is bypassed is a freeway-type road, since senseless alternative routes, for example via parallel lanes ("false alternatives"), are thereby prevented. It is however possible to set any minimum length.

An alternative route may generally be generated identically by several possible signature links. It has proven to be expedient if the signature link lies as close as possible to the middle of the bypass generated thereby, in particular in order to avoid possible artefacts that arise when the signature link lies right at the beginning or end of the bypass generated thereby.

Signature link candidates receive a better rating if they lie as close as possible to the middle of the bypass generated thereby.

The computational expenditure to perform a separate route calculation for each signature link in question, in order to compare the route arising in each case with the original route, would obviously be unacceptable. A description is now given of an algorithm that supplies both the set of signature link candidates and the parameters for calculating their respective evaluation in just one further processing step.

Figure 4A:
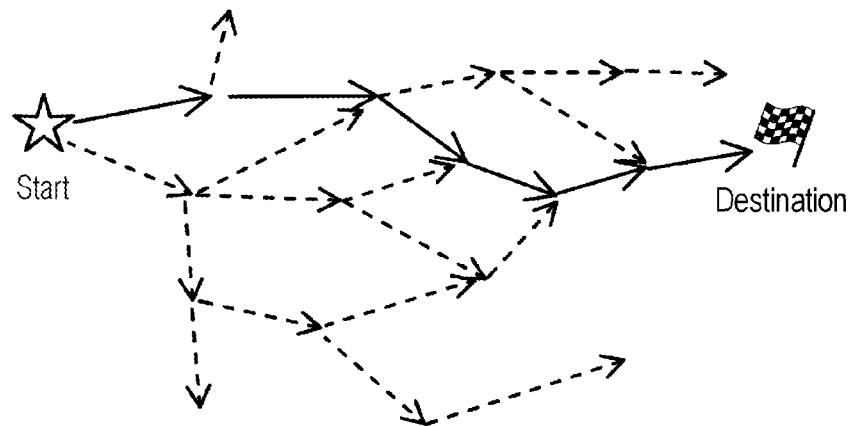
FIGS. 4a and b show exemplary embodiments of an efficient calculation of the evaluation criteria.
Figure 4B:
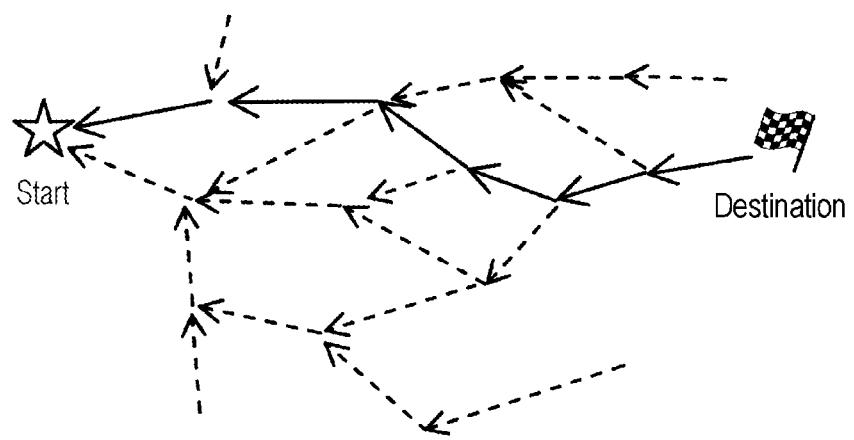

FIG. 4a and FIG. 4b show the efficient calculation of the evaluation criteria. Only connection options that have already been expanded in the possibly artificially extended initial route calculation are considered both as signature link candidates and as components of the alternative route candidates spanned thereby.

As an additional result of the initial route search, the optimum route from the start to the respective waypoint, the abstract costs of the route and optionally further parameters entrained in the process, such as the distance of the optimum route from the start, are already known for each signature link of these connection options.

It is furthermore assumed that the costs and distance from the start or to the destination are known for each waypoint along the initial route. This information may be compiled when generating the initial route.

The connection options that are expanded in the initial route search span a subgraph of the road network that contains the start, destination and at least one connection between them, specifically the initial route.

FIG. 4b shows a subgraph on which a full breadth-first search starting from the destination is performed, wherein the connection options are in each case, followed in their opposing direction, but also assuming the original physical navigation direction.

This in principle requires a similar number of expansion steps as required for the initial route search. The effort per step may however be significantly reduced if the determined costs per connection option and the respective possible transitions are stored in the initial route calculation, such that database access operations and new cost calculations are able to be dispensed with for the backward expansion. With a suitable implementation, the backward expansion may therefore be performed significantly faster than the initial route calculation.

Each connection option that is expanded in this backward expansion is a signature link candidate for the sought signature link. Connection options to dead ends that arose in the initial route search are not reached by the backward expansion and are therefore omitted as a signature link candidate, as illustrated in dashed lines in FIG. 4b. The set of connection options reached and expanded in the backward expansion, provided that they do not lie on the initial route, is stored as a signature link candidate set, as illustrated in FIGS. 4a and 4b as connection options not shown in dashed lines.

In the same way as the additional results of the initial route calculation, the backward expansion in each case delivers the best available route to the destination for each expanded connection option, i.e. the route on which the waypoint was reached in the backward expansion, as well as its costs and possibly further parameters, such as for example the distance.

Since the initial route is already known, in the backward expansion for each expanded connection option, it is also possible to entrain the point at which the route, on which it was reached from the destination, leaves the initial route (in relation to the direction of the backward expansion), i.e. the point at which the bypass spanned by the waypoint (in relation to the direction of travel) meets back up with the initial route. Since the costs and distance along the initial route from this point to the destination are known, the difference may also be calculated as the costs and distances from each signature link candidate to the corresponding "join", as illustrated in FIG. 5.

Figure 5:
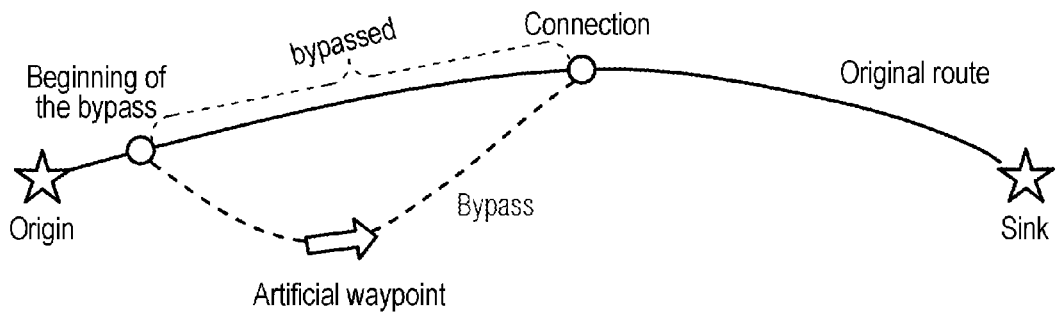
FIG. 5 shows an exemplary embodiment of a branch of an alternative route from the initial route.

At the end of the backward expansion, when all of the routes available in the subgraph have been expanded to the start, the points at which all of the alternative routes that are possible in principle branch off from the initial route are also known—beginning of the respective bypass, "branch-off" as illustrated in FIG. 5. The costs and distance from the start along the initial route to the various branch points are also assumed to be known. In a last iteration, each signature link candidate is assigned its respective branch, as a result of which costs and length of the bypass to the signature link candidate are also able to be calculated.

This means that all of the input data are available to calculate the three cost factors for each connection option of the signature link candidate set:

Cost factor:
Cost of the bypass: as the sum of the costs from the branch point to the signature link candidate and the costs from the signature link candidate to the "join";
Cost of the bypassed route section: as the difference in the costs along the original route from the start to the "join" and from the start to the "branch-off" as illustrated in FIG. 5.

Figure 6:
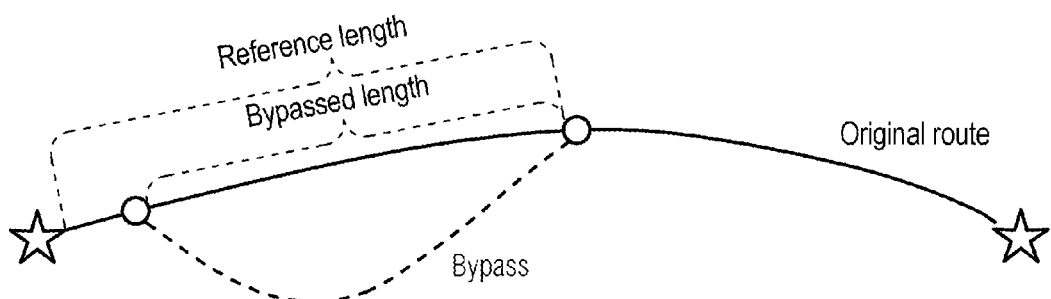
FIG. 6 shows an exemplary embodiment of a calculation of a bypassed route.

Bypassed distance:
Length of the bypassed section: the difference in distances, along the original route from the start to the "join" and from the start to the "branch-off";
Length of the initial overall route: Known;
Length of the "reference length": Also a known length along the initial route, as illustrated in FIG. 6.

Figure 7:
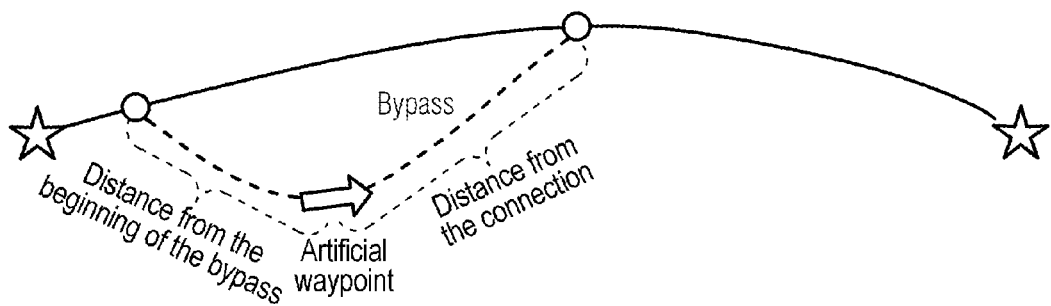
FIG. 7 shows an exemplary embodiment of the centrality of a waypoint candidate.

Centrality:
Distance from the "branch-off" to the signature link candidate: Route length from the start to the signature link candidate minus length along the initial route to the branch-off; Distance from the signature link candidate to the "join": Route length from the signature link candidate to the destination minus length along the initial route from the join to the destination, as illustrated in FIG. 7.

For each connection option from the signature link candidate set, the three or similar criteria and their possibly weighted product are calculated as an overall rating.

The signature link candidate with the best rating and that does not violate any exclusion criteria is chosen as the signature link for the alternative route.

The optimum route via this signature link may be determined from the predecessor relationships of the initial route search and the backward expansion. The first alternative route is thus known.

In order to determine further alternative routes, the described method is repeated, wherein, in addition to the initial route, the previously calculated alternative routes are also each used to evaluate the bypass, that is to say "branch-off" and "join" may therefore also lie on a previously calculated alternative route.

Figure 8:
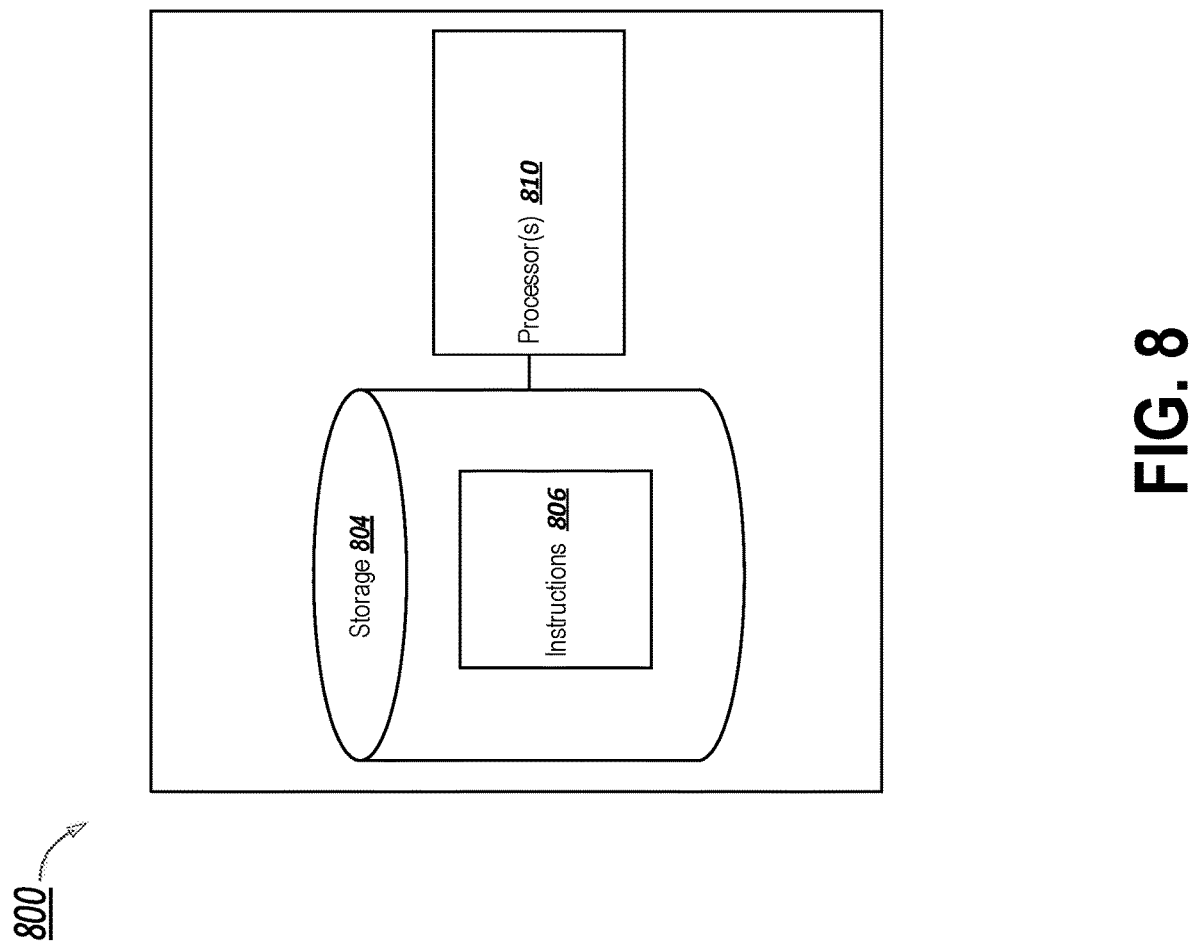
FIG. 8 shows an exemplary navigation system

FIG. 8 shows an exemplary navigation system 800. Navigation system 800 includes a storage 804 which can be a non-transitory storage. Stored within storage 804 are instructions 806, which can instruct one or more processors 810 of the navigation system 800 to perform operations as disclosed above.

What is claimed is:
1. A method for generating route suggestions comprising:
determining an initial route from a starting position to a destination position using an initial route calculation comprising an A* algorithm or Dijkstra algorithm and wherein the initial route comprises a plurality of nodes and a plurality of edges, wherein each node represents an intersection of roads and each edge represents a road connecting two nodes, wherein the initial route is a series of alternating nodes and edges, and wherein the starting position is a first node of the plurality of nodes and destination position is a final node of the plurality of nodes;
identifying, edges calculated during the initial route calculation that connect to at least one node that is not on the initial route as potential intermediate destinations;
selecting one of the potential intermediate destinations by performing a cost analysis for each potential intermediate destination, the cost analysis comprising an analysis of position of each potential intermediate destination relative to the initial route;
calculating at least one alternative route from the starting position to the destination position via the selected intermediate destination;

evaluating cost parameters of a deviating section and cost parameters of a bypassed section of the initial route, wherein the deviating section is a section of the alternative route that is not shared with the initial route and comprises the selected intermediate destination; and suggesting, based on the evaluation of the cost parameters, an alternative route from the at least one calculated alternative route.

2. The method of claim 1, further comprising calculating a bidirectional route, wherein the bidirectional route uses the destination position as the first node, and the starting position as the final node.

3. The method of claim 1, further comprising calculating two or more alternative routes.

4. The method of claim 1, wherein a cost computation of the alternative route is compared with a cost computation of the initial route.

5. The method of claim 1, further comprising evaluating at least one of distance parameters or a position of the bypassed section on the initial route.

6. The method of claim 1, further comprising evaluating a position of the selected intermediate destination relative to the starting position and the destination position within the deviating section.

7. The method of claim 1, wherein the deviating section has a minimum length of 25 km for a freeway-like route or a minimum length of 200 m for short routes.

8. The method of claim 1, wherein the cost analysis comprises comparing a distance from the initial route along the deviating section to the selected intermediate destination and a distance from the selected intermediate destination along the deviating section to the initial route.

9. The method of claim 1, further comprising performing a backward expansion on the basis of the determined cost and distance parameters of the expanded route suggestions of the initial route calculation.

10. A navigation system, comprising:
one or more processors; and
a non-transitory computer-readable storage medium coupled to the one or more processors and storing programming instructions for execution by the one or more processors, the programming instructions instruct the one or more processors to:

determine an initial route from a starting position to a destination position using an initial route calculation comprising an A* algorithm or Dijkstra algorithm and wherein the initial route comprises a plurality of nodes and a plurality of edges, wherein each node represents an intersection of roads and each edge represents a road connecting two nodes, wherein the initial route is a series of alternating nodes and edges, and wherein the starting position is a first node of the plurality of nodes and destination position is a final node of the plurality of nodes;

identify edges calculated during the initial route calculation that connect to at least one node that is not on the initial route as potential intermediate destinations;

select one of the potential intermediate destinations by performing a cost analysis for each potential intermediate destination, the cost analysis comprising an analysis of position of each potential intermediate destination relative to the initial route;

calculate at least one alternative route from the starting position to the destination position via the selected intermediate destination;

evaluate cost parameters of a deviating section and cost parameters of a bypassed section of the initial route, wherein the deviating section is a section of the alternative route that is not shared with the initial route and comprises the selected intermediate destination; and suggest, based on the evaluation of the cost parameters, an alternative route from the at least one calculated alternative route.

11. The navigation system of claim 10, the programming instructions further instruct the one or more processors to:
evaluate at least one of cost parameters, distance parameters, or position of the potential intermediate destinations.

12. The method of claim 1, wherein evaluating cost parameters of a deviating section and cost parameters of a bypassed section comprises evaluating the initial route and the alternative route using a same set of cost parameters.

* * * * *